Dec. 13, 1927.
D. J. McAULIFF
TRACTOR PLOW
Filed Nov. 26, 1926
1,652,869
4 Sheets-Sheet 3
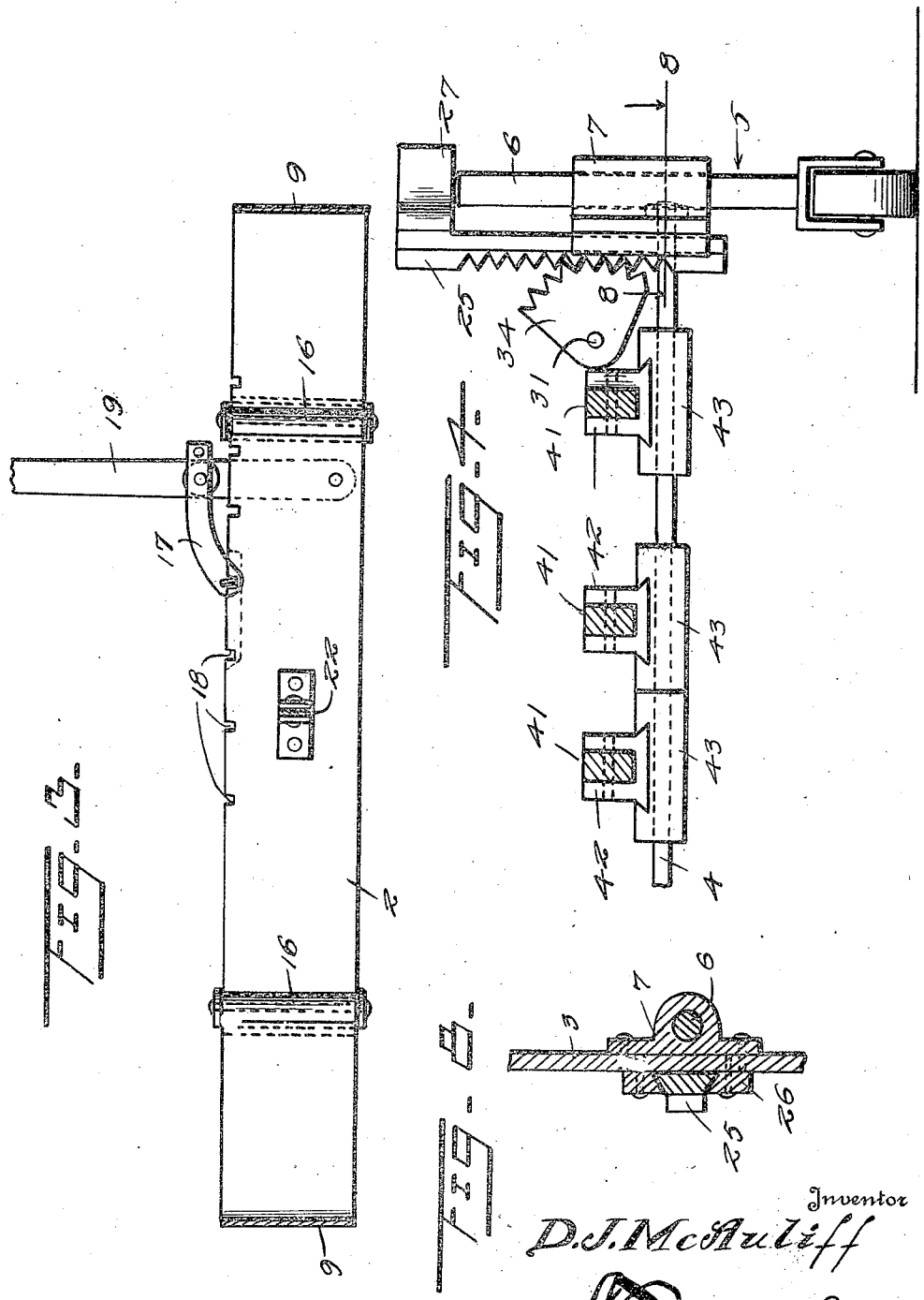
Inventor
D. J. McAuliff
Attorney

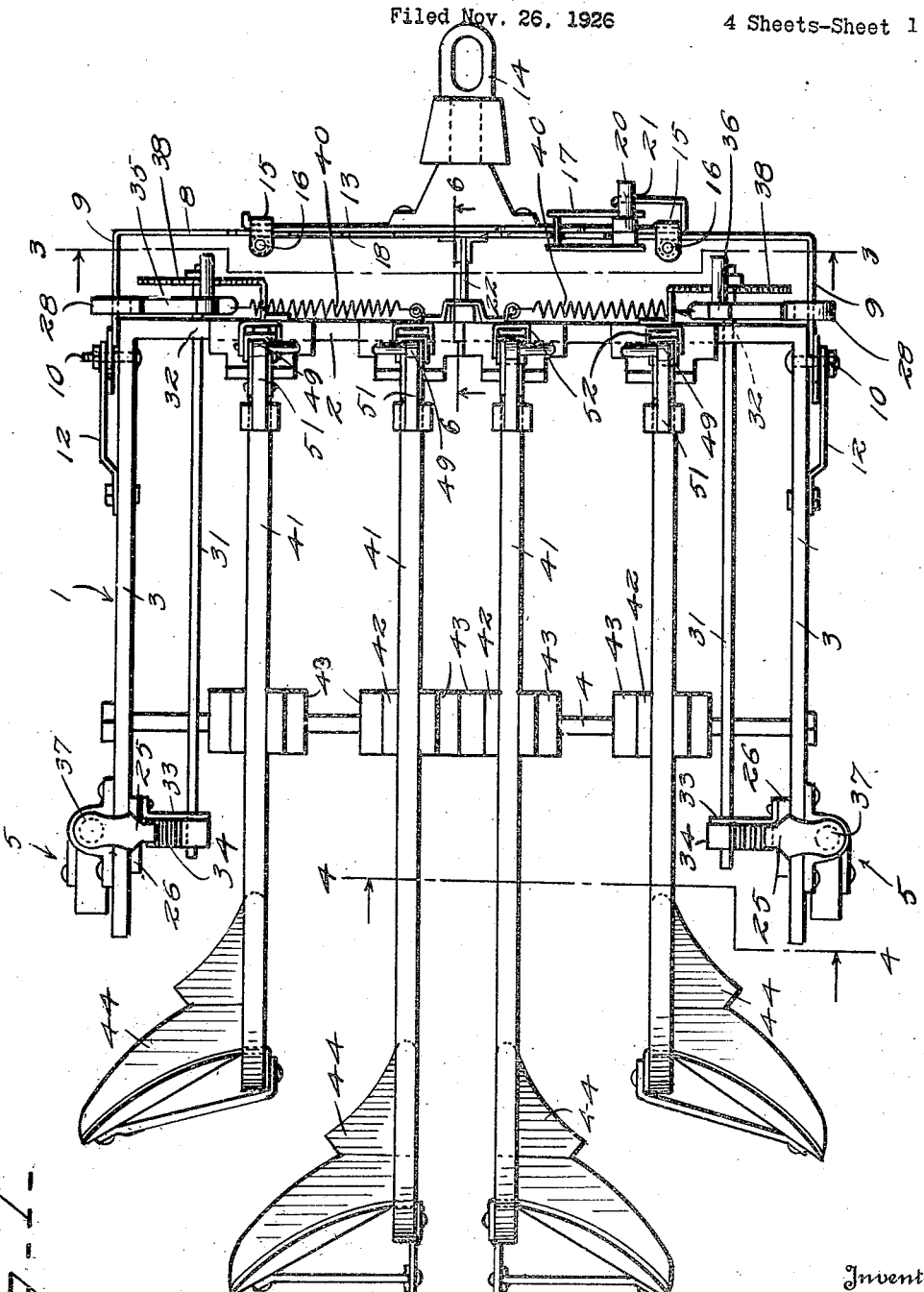

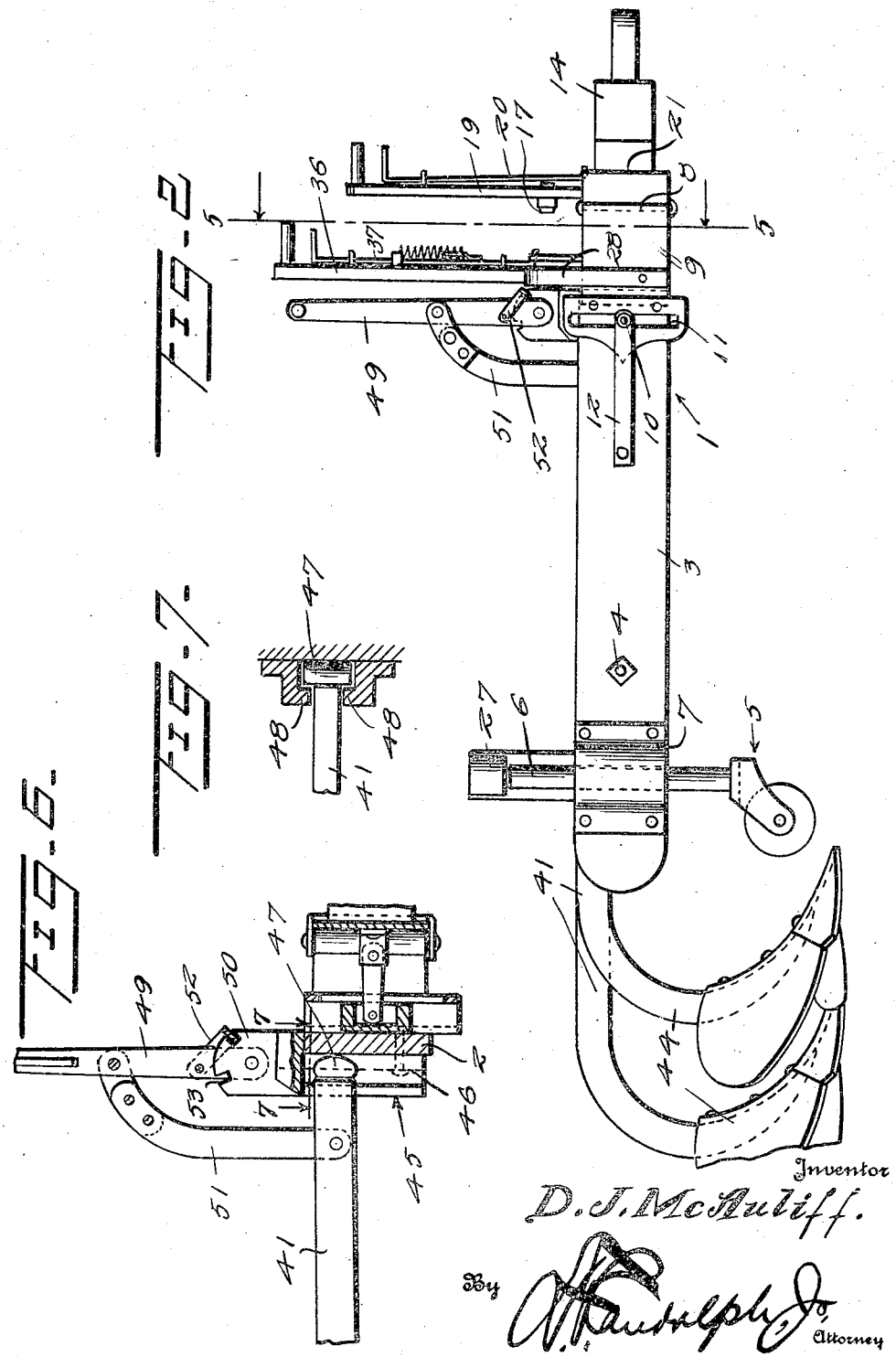

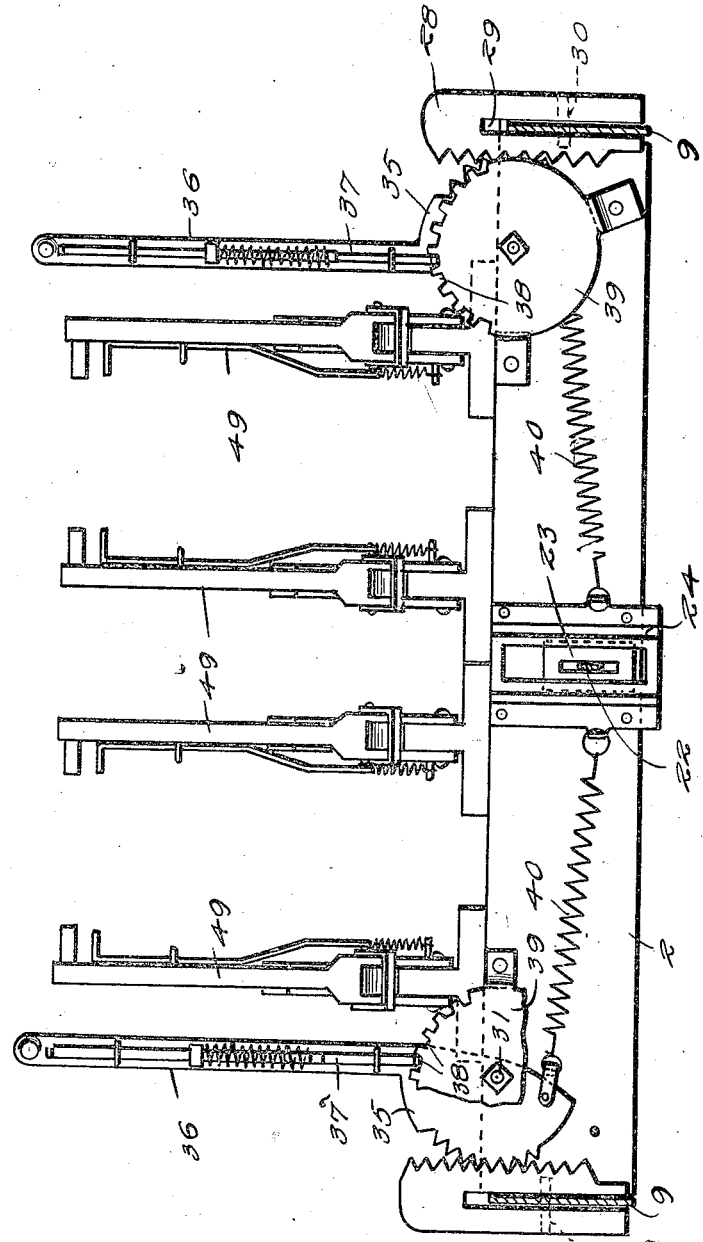

Patented Dec. 13, 1927.

1,652,869

UNITED STATES PATENT OFFICE.

DANIEL J. McAULIFF, OF CROOKED CREEK, PENNSYLVANIA.

TRACTOR PLOW.

Application filed November 26, 1926. Serial No. 150,920.

This invention relates to a tractor plow of the gang type and comprising a frame, wheels supporting the rear portion of the frame, and plows carried by the frame.

The invention has for one of its objects to provide a machine of this character which shall include novel means for supporting the frame from the wheels in a manner to permit it to be rocked about a horizontal axis extending transversely of the machine, to permit it to be bodily adjusted in a vertical direction, and to permit it to be adjusted or rocked about the longitudinal axis of the machine.

The invention has for a further object to provide a machine of the character stated which shall include novel means for mounting the beams of the plows on the frame in a manner to permit them to be adjusted with the frame and to permit them to be readily adjusted with respect to the frame and each other.

The invention has for a further object to provide a machine of the character stated which shall include novel means for connecting it to a tractor and novel means for connecting the draft means to the frame in a manner to permit the draft means and frame to be relatively adjusted in a vertical direction and to move relatively about a horizontal axis extending transversely of the machine.

Figure 1 is a top plan view of the plow,
Figure 2 is a view in side elevation of the plow,
Figure 3 is a sectional view taken on the vertical planes indicated by the line 3—3 of Figure 1,
Figure 4 is a sectional view taken on the vertical planes indicated by the line 4—4 of Figure 1,
Figure 5 is a sectional view taken on the vertical plane indicated by the line 5—5 of Figure 2,
Figure 6 is a sectional view taken on the vertical plane indicated by the line 6—6 of Figure 1,
Figure 7 is a sectional view taken on the horizontal plane indicated by the line 7—7 of Figure 6, and
Figure 8 is a sectional view taken on the horizontal plane indicated by the line 8—8 of Figure 4.

Corresponding and like parts are referred to in the following description, and designated in the several views of the accompanying drawings, by similar reference characters.

The plow comprises a frame 1 which consists of a front bar 2, side bars 3, and a rear bar 4. The side bars 3 project rearwardly beyond the rear bar 4, and the latter is of cylindrical formation. The frame 1 is supported at its rear side by casters 5 of which the spindles 6 are journaled in bearings 7 for axial and rotative movements so as to permit the casters to turn with respect to the frame and to permit the frame to move vertically with respect to the casters. The bearings 7 are secured to the outer faces of the side bars 3 rearwardly beyond the rear bar 4. A draft bar 8 extends across the front of the frame 1, and is provided with rearwardly directed ends 9 which are connected to the side bars 3 in a manner to permit the draft bar to have pivotal movement with respect to the frame and to permit the draft bar to be adjusted vertically with respect to the frame. The draft bar 8 is connected to the frame 1 by bolts 10 carried by the side bars 3 and passing through vertical slots 11 in the ends 9 of the side bar. Braces 12 for the bolts 10 are secured thereto and to the side bars 3. A slide 13 to which a clevis 14 is secured, is secured against the front face of the draft bar 8 by clips 15 which are provided with rollers 16 contacting with the rear face of the draft bar. The slide 13 is adapted to be adjusted with respect to the draft bar 8 so as to position the clevis 14 at the longitudinal center of the plow or at various distances laterally beyond said center. The slide 13 is adapted to be adjusted and secured in adjusted position by a dog 17 engaging in one of a plurality of notches 18 in the upper edge of the draft bar 8. The dog 17 is pivotally secured to a lever 19 which in turn is pivoted to the slide 13 and is provided with a latch 20 adapted to engage in a notch 21 in the upper edge of the slide for the purpose of holding the lever against casual movement. The draft bar 8 and frame 1 are connected at the longitudinal center of the plow by a link 22 which is pivotally connected to the draft bar and to a block 23 mounted for vertical movement in a guide 24 secured to the front face of the frame bar 2.

Rack bars 25 are supported for vertical movement by guides 26 which are secured to the inner faces of the side bars 3 in alinement with the bearings 7. The racks 25 are provided at their upper ends with outwardly directed extension or bearing lugs 27 which rest upon the upper ends of the spindles 6. Vertically disposed rack bars 28, which are provided with slots 29 for the reception of the ends 9 of the draft bar 8, are pivotally connected to said ends as at 30. The pivots 30 connect the rack bars 28 to the draft bar 8 for movement about horizontal axes extending transversely of the plow. Shafts 31 which extend longitudinally of the plow, are journaled at their front ends in bearings 32 formed in the front bar 2 and at their rear ends in bearings 33 secured to the guides 26. Sector pinions 34 are secured to the shafts 31 and mesh with the rack bars 25, and sector pinions 35 are secured to the shafts and mesh with the rack bars 28. Hand levers 36 extend upwardly from the pinions 35, and are provided with latches 37 which are adapted to engage in the notches 38 of disks 39 secured to the front face of the front bar 2. Coil springs 40 are secured to the pinions 35 below the shafts 31 and to the guide 24.

Beams 41 are pivoted intermediate their ends to blocks 42 slidably supported by sleeves 43. The sleeves 43 are rockably mounted on the rear bar 4, and the blocks 42 are movable with the sleeves and movable with respect thereto transversely of the bar 4. The beams 41 are provided at their rear ends with plows 44, and have their front ends positioned in guides 45 secured to the rear face of the front bar 2. The guides 45 are provided with vertical slots 46 for the reception of the front ends of the beams 41, and said ends of the beams are laterally enlarged as shown at 47 and contact with flanges 48 carried by the guides 45 and with the rear face of the front bar 2 in order to limit the longitudinal movement or play of the beams. The beams 41 are adapted to be adjusted about the rear bar 4 by vertical levers 49 pivoted at their lower ends to brackets 50 secured to the upper ends of the guides 45. The levers 49 are connected to the beams 41 by links 51, and are provided with latches 52 which engage notches 53 in the brackets 50 for the purpose of securing the levers against casual movement.

From the foregoing description, taken in connection with the accompanying drawings, it will be apparent that the frame and plows may be adjusted bodily in a vertical direction and about the longitudinal axis of the machine, and that the several plows may be adjusted with respect to the frame about an axis extending transversely of the machine, whereby to adapt the machine for plowing level or inclined fields and to regulate the depth of furrows. The vertical adjustment of the frame and plows is effected through the medium of both of the levers 36, and the adjustment of the frame and plows about the horizontal axis of the machine is effected through the medium of one or the other of the levers 36. The levers 36 and associated parts function to secure the frame in adjusted position. The adjustment of the respective plows with respect to the frame is effected through the medium of the respective levers 49 which and the parts associated therewith function to secure the plows in adjusted position. The levers 36 and 49 are arranged at the front of the machine within convenient reach. It will also be apparent that the position of the clevis 14 with respect to the longitudinal axis of the machine may be altered, and that it may be secured in alinement with said axis or at either side thereof through the medium of the lever 19 and associated parts.

The plow turns the ground all one way, and eliminates dead furrows and ridges.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A machine of the character set forth, comprising a frame, plows carried by the frame, wheels connected to the frame to permit the former to turn with respect to the latter and the latter to be adjusted vertically with respect to the former, a draft bar pivotally and adjustably secured to the frame, rack bars associated with the wheels and draft bar, shafts journaled on the frame, pinions fixed to the shafts and engaging the rack bars, and shaft actuating and locking means.

2. A machine of the character set forth, comprising a frame, supporting means for the frame, beams pivoted to the frame, plows secured to the rear ends of the beams, guides secured to the frame for the reception of the front ends of the beams, levers pivoted to the frames, links connecting the levers and beams, and means securing the levers against casual movement.

3. A machine of the character set forth, comprising a frame, wheels connected to the frame to permit the latter to be adjusted vertically with respect thereto, a draft bar connected to the frame to permit the latter to be adjusted with respect thereto, a block slidably carried by the frame, a link connected to the block and draft bar, means for adjusting the frame and securing it in adjusted position, and plows carried by the frame.

4. A machine of the character set forth, comprising a frame, wheels connected to the frame, a draft bar connected to the frame and provided with notches, a clevis, means for securing the clevis to the draft bar for lateral sliding movement, a lever pivoted to said means, a latch cooperating with said means and lever to hold the latter against casual movement with respect to the former, and a dog pivoted to the lever and engaging in one of the notches of the draft bar.

5. A machine of the character set forth, comprising wheel supported spindles, upright rack bars supported by the spindles, a frame slidably associated with the rack bars, a draft bar pivotally and adjustably connected to the frame, upright rack bars pivoted to the draft bar, pinions journaled on the frame and meshing with the rack bars, pinion actuating and securing means, and plows carried by the frame.

6. A machine of the character set forth, comprising wheels, a frame, means for supporting the rear portion of the frame from the wheels for vertical adjustment, a bar carried by the frame in advance of its connection with the wheels, beams pivoted intermediate their ends to the bar, plows carried by the beams, beam adjusting means carried by the frame and connected to the beams, and draft means connected to the frame.

In testimony whereof I affix my signature.

DANIEL J. McAULIFF.